(12) United States Patent
Cao

(10) Patent No.: US 11,366,361 B2
(45) Date of Patent: Jun. 21, 2022

(54) ARRAY SUBSTRATE AND DISPLAY PANEL

(71) Applicant: SHENZHEN CHINA STAR OPTOELECTRONICS SEMICONDUCTOR DISPLAY TECHNOLOGY CO., LTD., Guangdong (CN)

(72) Inventor: Wu Cao, Guangdong (CN)

(73) Assignee: SHENZHEN CHINA STAR OPTOELECTRONICS SEMICONDUCTOR DISPLAY TECHNOLOGY CO., LTD., Guangdong (CN)

( * ) Notice: Subject to any disclaimer, the term of this patent is extended or adjusted under 35 U.S.C. 154(b) by 196 days.

(21) Appl. No.: 16/640,797

(22) PCT Filed: Jan. 6, 2020

(86) PCT No.: PCT/CN2020/070535
§ 371 (c)(1),
(2) Date: Feb. 21, 2020

(87) PCT Pub. No.: WO2021/120347
PCT Pub. Date: Jun. 24, 2021

(65) Prior Publication Data
US 2021/0405484 A1     Dec. 30, 2021

(30) Foreign Application Priority Data
Dec. 19, 2019  (CN) .......................... 201911316846.5

(51) Int. Cl.
*G02F 1/1343* (2006.01)
*G02F 1/1362* (2006.01)

(52) U.S. Cl.
CPC .. *G02F 1/134309* (2013.01); *G02F 1/136218* (2021.01); *G02F 1/136222* (2021.01); *G02F 1/136286* (2013.01)

(58) Field of Classification Search
None
See application file for complete search history.

(56) References Cited

U.S. PATENT DOCUMENTS

2007/0229430 A1* 10/2007 Wang ................ G02F 1/134309
                                                              345/96
2007/0291208 A1* 12/2007 Wang ................ G02F 1/133707
                                                              349/129

(Continued)

FOREIGN PATENT DOCUMENTS

| CN | 101424833 A | 5/2009 |
|---|---|---|
| CN | 102023420 A | 4/2011 |

(Continued)

*Primary Examiner* — Shan Liu

(57) ABSTRACT

An array substrate is provided. The array substrate includes: a substrate; a plurality of scan lines; a plurality of data lines; and a plurality of pixel units disposed in a matrix. In two adjacent ones of the pixel units in two adjacent rows, a second pixel electrode in an auxiliary area of one of the two adjacent ones of the pixel units extends to a main display area of the other of the two adjacent ones of the pixel units. A second pixel electrode extending part is disposed between a first pixel electrode and a corresponding one of the data lines. A metal electrode plate for light shielding is not disposed in an area in which the second pixel electrode extending part is disposed, and thus a transmittance is increased.

12 Claims, 5 Drawing Sheets

(56) References Cited

U.S. PATENT DOCUMENTS

| | | | |
|---|---|---|---|
| 2010/0157184 A1* | 6/2010 | Ong | ............ G02F 1/133707 349/37 |
| 2011/0063557 A1 | 3/2011 | Kim et al. | |
| 2012/0236242 A1* | 9/2012 | Ong | ............ G02F 1/133707 349/143 |
| 2014/0204316 A1 | 7/2014 | Kim et al. | |
| 2016/0026050 A1 | 1/2016 | Lin et al. | |

FOREIGN PATENT DOCUMENTS

| | | |
|---|---|---|
| CN | 103941479 A | 7/2014 |
| CN | 105116637 A | 12/2015 |
| JP | H09243999 A | 9/1997 |

\* cited by examiner

ARRAY SUBSTRATE AND DISPLAY PANEL

TECHNICAL FIELD

The present disclosure relates to the display technology field, and more particularly to an array substrate and a display panel.

BACKGROUND

In an array substrate of a conventional display device, signals of data lines are shielded by metal electrode plates for light shielding which are disposed at one side of the array substrate in a main display area or by two common electrode plates which have the same voltage and are respectively disposed on the array substrate and a color filter substrate, thereby avoiding that the signals of the data lines interferes with signals of first pixel electrodes. However, the metal electrode plates for light shielding or the common electrode plates decrease an area of the first pixel electrodes, and thus an aperture ratio and a transmittance are lowered.

SUMMARY OF DISCLOSURE

The present disclosure provides an array substrate to solve the technical problem that an aperture ratio and a transmittance are lowered in the prior art.

To solve the above-mentioned technical problem, technical schemes provided by the present disclosure are described as follows.

An array substrate provided by an embodiment of the present disclosure includes: a substrate; a plurality of scan lines disposed on the substrate in a horizontal direction and arranged in parallel; a plurality of data lines disposed on the substrate in a vertical direction and arranged in parallel; and a plurality of pixel units disposed on the substrate in a matrix, each of the scan lines disposed corresponding to one row of the pixel units, each of the data lines disposed corresponding to one column of the pixel units, and two adjacent ones of the data lines defining boundaries of the pixel units, wherein each of the pixel units has a main display area and an auxiliary display area, each of the pixel units includes a first pixel electrode positioned in the main display area and a second pixel electrode positioned in the auxiliary display area, the auxiliary display area of one of the pixel units is disposed adjacent to the main display area of another one of the pixel units, the one of the pixel units and the another one of the pixel units are positioned in two adjacent rows, the second pixel electrode positioned in the auxiliary display area of the one of the pixel units extends, between the two adjacent ones of the pixel units, to the main display area of the another one of the pixel units, the second pixel electrode includes a second pixel electrode extending part positioned in the main display area of the another one of the pixel units and a second pixel electrode body part positioned in the auxiliary display area of the one of the pixel units, the second pixel electrode extending part is disposed between the first pixel electrode and a corresponding one of the data lines, and the second pixel electrode extending part surrounds a part of the first pixel electrode near the corresponding one of the data lines.

In the array substrate provided by the present disclosure, the second pixel electrode extending part is disposed at two sides of the first pixel electrode, and a metal electrode plate for light shielding and shielding the corresponding one of the data lines is not disposed between the corresponding one of the data lines and the first pixel electrode.

In the array substrate provided by the present disclosure, the second pixel electrode extending part is disposed at one side of the first pixel electrode near the corresponding one of the data lines, a metal electrode plate for light shielding and shielding the corresponding one of the data lines is not disposed at the one side of the first pixel electrode near the corresponding one of the data lines, and the second pixel electrode extending part is not disposed at the other side of the first pixel electrode.

In the array substrate provided by the present disclosure, in the main display area, the second pixel electrode extending part is disposed to overlap with the corresponding to one of the data lines.

In the array substrate provided by the present disclosure, in the main display area, an overlapping range of the second pixel electrode extending part and the corresponding one of the data lines 40 is from 0.5 micrometers to 3 micrometers.

In the array substrate provided by the present disclosure, in the main display area, the second pixel electrode extending part is disposed to not overlap with the corresponding one of the data lines.

In the array substrate provided by the present disclosure, the second pixel electrode extending part surrounds half of the first pixel electrode.

In the array substrate provided by the present disclosure, the second pixel electrode extending part surrounds the first pixel electrode.

In the array substrate provided by the present disclosure, the second pixel electrode extending part and the first pixel electrode are insulated with each other.

In the array substrate provided by the present disclosure, a distance between the second pixel electrode extending part and the first pixel electrode is from 3 micrometers to 5 micrometers.

A display panel provided by an embodiment of the present disclosure includes an array substrate, a color filter substrate, and liquid crystals positioned between the array substrate and the color filter substrate. The array substrate includes: a substrate; a plurality of scan lines disposed on the substrate in a horizontal direction and arranged in parallel; a plurality of data lines disposed on the substrate in a vertical direction and arranged in parallel; and a plurality of pixel units disposed on the substrate in a matrix, each of the scan lines disposed corresponding to one row of the pixel units, each of the data lines disposed corresponding to one column of the pixel units, and two adjacent ones of the data lines defining boundaries of the pixel units, wherein each of the pixel units has a main display area and an auxiliary display area, each of the pixel units includes a first pixel electrode positioned in the main display area and a second pixel electrode positioned in the auxiliary display area, the auxiliary display area of one of the pixel units is disposed adjacent to the main display area of another one of the pixel units, the one of the pixel units and the another one of the pixel units are positioned in two adjacent rows, the second pixel electrode positioned in the auxiliary display area of the one of the pixel units extends, between the two adjacent ones of the pixel units, to the main display area of the another one of the pixel units, the second pixel electrode includes a second pixel electrode extending part positioned in the main display area of the another one of the pixel units and a second pixel electrode body part positioned in the auxiliary display area of the one of the pixel units, the second pixel electrode extending part is disposed between the first pixel electrode and a corresponding one of the data lines, and the second pixel electrode extending part surrounds a part of the first pixel electrode near the corresponding one of the data lines.

In the display panel provided by the present disclosure, the second pixel electrode extending part is disposed at two sides of the first pixel electrode, and a metal electrode plate for light shielding and shielding the corresponding one of the data lines is not disposed between the corresponding one of the data lines and the first pixel electrode.

In the display panel provided by the present disclosure, the second pixel electrode extending part is disposed at one side of the first pixel electrode near the corresponding one of the data lines, a metal electrode plate for light shielding and shielding the corresponding one of the data lines is not disposed at the one side of the first pixel electrode near the corresponding one of the data lines, and the second pixel electrode extending part is not disposed at the other side of the first pixel electrode.

In the display panel provided by the present disclosure, in the main display area, the second pixel electrode extending part is disposed to overlap with the corresponding to one of the data lines.

In the display panel provided by the present disclosure, in the main display area, an overlapping range of the second pixel electrode extending part and the corresponding one of the data lines 40 is from 0.5 micrometers to 3 micrometers.

In the display panel provided by the present disclosure, in the main display area, the second pixel electrode extending part is disposed to not overlap with the corresponding one of the data lines.

In the display panel provided by the present disclosure, the second pixel electrode extending part surrounds half of the first pixel electrode.

In the display panel provided by the present disclosure, the second pixel electrode extending part surrounds the first pixel electrode.

In the display panel provided by the present disclosure, the second pixel electrode extending part and the first pixel electrode are insulated with each other.

In the display panel provided by the present disclosure, a distance between the second pixel electrode extending part and the first pixel electrode is from 3 micrometers to 5 micrometers.

Advantageous effect of the present disclosure is described as follows. The present disclosure provides an array substrate. The array substrate includes a substrate, a plurality of scan lines disposed on the substrate in a horizontal direction and arranged in parallel, a plurality of data lines disposed on the substrate in a vertical direction and arranged in parallel, and a plurality of pixel units disposed on the substrate in a matrix. Each of the scan lines is disposed corresponding to one row of the pixel units. Each of the data lines is disposed corresponding to one column of the pixel units. Two adjacent ones of the data lines define boundaries of the pixel units. Each of the pixel units has a main display area and an auxiliary display area. Each of the pixel units includes a first pixel electrode positioned in the main display area and a second pixel electrode positioned in the auxiliary display area. The auxiliary display area of one of the pixel units is disposed adjacent to the main display area of another one of the pixel units. The one of the pixel units and the another one of the pixel units are positioned in two adjacent rows. The second pixel electrode positioned in the auxiliary display area of the one of the pixel units extends, between the two adjacent ones of the pixel units, to the main display area of the another one of the pixel units. The second pixel electrode includes a second pixel electrode extending part positioned in the main display area of the another one of the pixel units and a second pixel electrode body part positioned in the auxiliary display area of the one of the pixel units. The second pixel electrode extending part is disposed between the first pixel electrode and a corresponding one of the data lines. The second pixel electrode extending part surrounds a part of the first pixel electrode near the corresponding one of the data lines. The second pixel electrode extending part in the auxiliary display area extends to the main display area in the direction of disposing the data lines to form the second pixel electrode extending part in the main display area. The second pixel electrode extending part is disposed near the corresponding one of the data lines or covers the corresponding one of the data lines. A voltage potential of the second pixel electrode extending part can isolate effect of an electric field of the correspond one of the data lines on the first pixel electrode. As such, the aperture ratio and the transmittance can be increased.

BRIEF DESCRIPTION OF DRAWINGS

In order to more clearly illustrate the embodiments or the technical schemes in the prior art, the following drawings of the embodiments or in the prior art will be briefly introduced. It is obvious that the drawings are merely some embodiments of the present disclosure, those skilled in the art may derive other drawings according the drawings described below without creative endeavor.

DETAILED DESCRIPTION OF EMBODIMENTS

Figure 1:
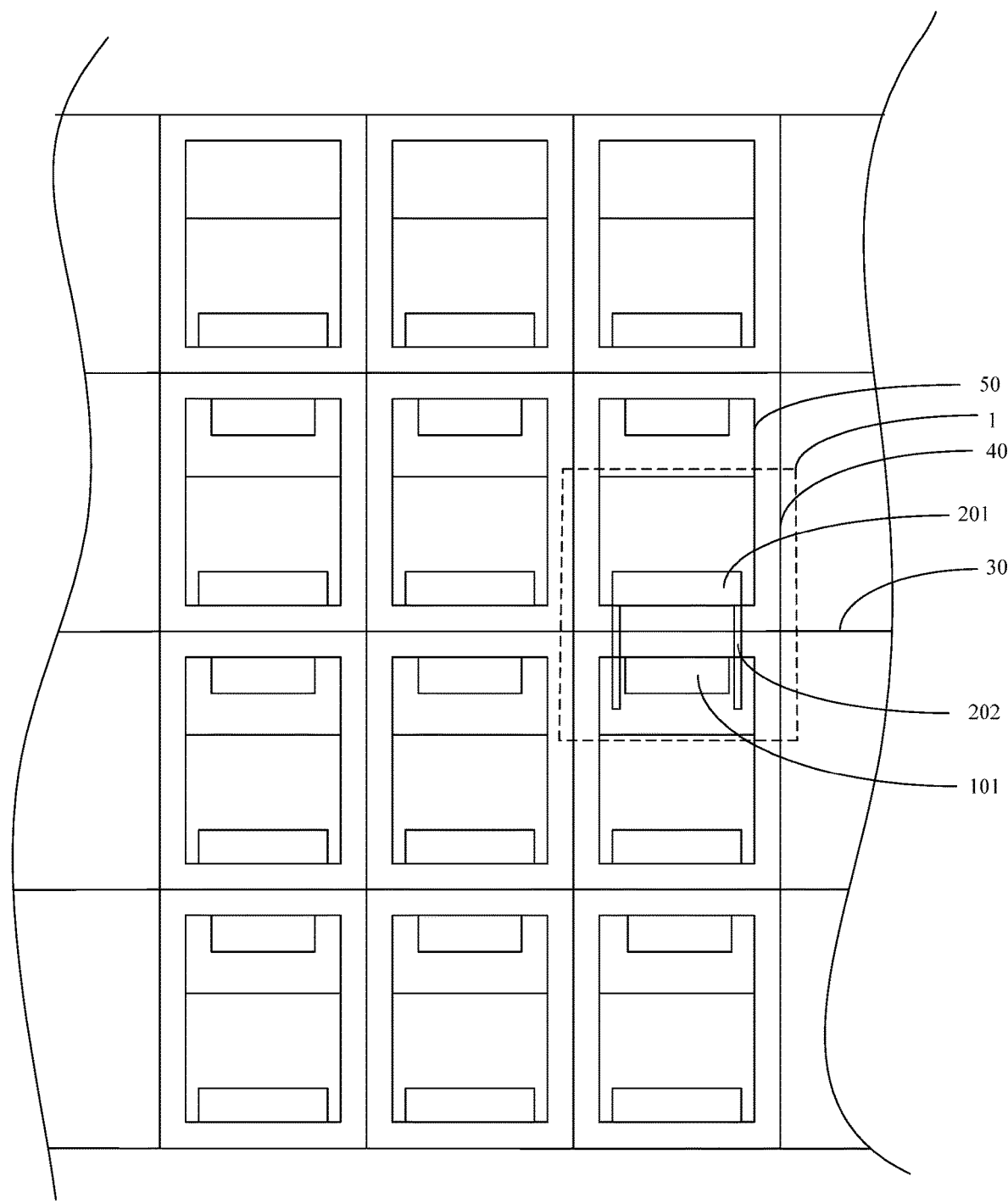
FIG. 1 illustrates a top view of an array substrate provided by an embodiment of the present disclosure.

Hereinafter, exemplary embodiments of the present disclosure will be described with reference to the accompanying drawings for illustrating specific embodiments which can be carried out by the present disclosure. The directional terms described in the present disclosure, such as upper, lower, front, rear, left, right, inner, outer, side, etc., are only directions with reference to the accompanying drawings, so that the used directional terms are used to describe and understand the present disclosure, but the present disclosure is not limited thereto. In the drawings, units with similar structures use the same numerals.

Embodiments of the present disclosure can solve the technical problem that an aperture ratio and a transmittance of a conventional display panel are lowered.

Figure 2:
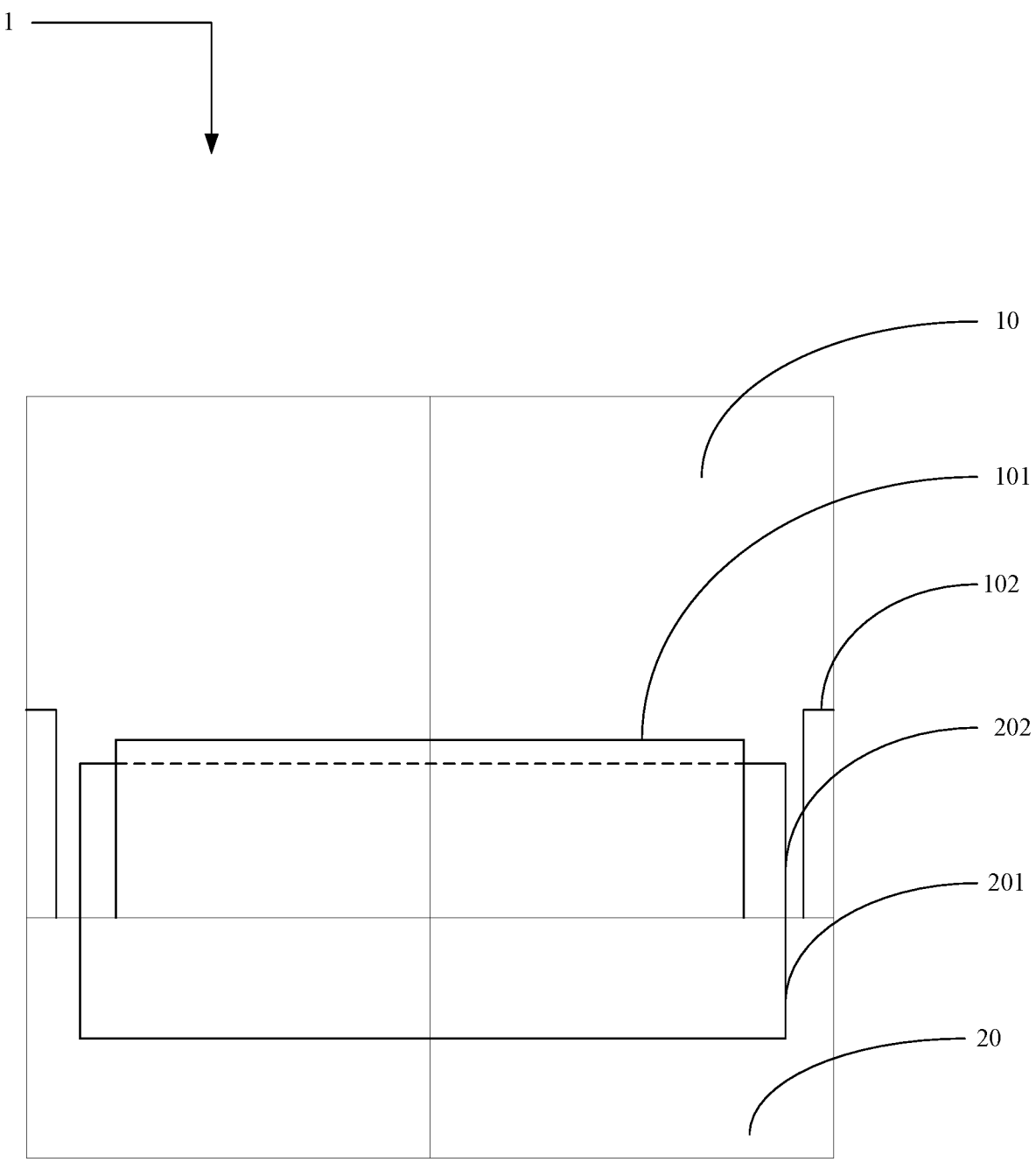
FIG. 2 illustrates a first enlarged diagram of the array substrate provided by an embodiment of the present disclosure.

As shown in FIG. 1 and FIG. 2, an array substrate provided by an embodiment of the present disclosure includes a substrate, a plurality of scan lines 30 disposed on the substrate in a horizontal direction and arranged in parallel, a plurality of data lines 40 disposed on the substrate in a vertical direction and arranged in parallel, and a plurality of pixel units 50 disposed on the substrate in a matrix. Each of the scan lines 30 is disposed corresponding to one row of the pixel units 50. Each of the data lines 40 is disposed corresponding to one column of the pixel units 50. Two adjacent ones of the data lines 40 define boundaries of the pixel units 50. Each of the pixel units 50 has a main display area 10 and an auxiliary display area 20. Each of the pixel units 50 includes a first pixel electrode 101 positioned in the main display area 10 and a second pixel electrode positioned in the auxiliary display area 20. The auxiliary display area 20 of one of the pixel units 50 is disposed adjacent to the main display area 10 of another one of the pixel units 50. The one of the pixel units 50 and the another one of the pixel units 50 are positioned in two adjacent rows. The second pixel electrode positioned in the auxiliary display area 20 of the one of the pixel units 50 extends, between the two adjacent ones of the pixel units 50, to the main display area of the another one of the pixel units 50. The second pixel electrode includes a second pixel electrode extending part 202 positioned in the main display area 10 of the another one of the pixel units 50 and a second pixel electrode body part 201 positioned in the auxiliary display area 20 of the one of the pixel units 50. The second pixel electrode extending part 202 is disposed between the first pixel electrode 101 and a corresponding one of the data lines 40. The second pixel electrode extending part 202 surrounds a part of the first pixel electrode 101 near the corresponding one of the data lines 40.

In the present embodiment, the main display area 10 and the auxiliary display area 20 respectively include four small areas. Voltage differences exist between the array substrate and a color filter substrate. By cooperation of devices, the voltage differences in the main display area 10 are greater than the voltage differences in the auxiliary display area 20, and orientations of liquid crystal molecules are different. Accordingly, a viewing angle is improved, and a brightness difference is embodied when an image is displayed. In particularly, in a middle or low gray level (e.g., L100 or below), it can be seen that the main display area 100 is in a bright state, and the auxiliary display area 20 is in a dark state.

In the present embodiment, the second pixel electrode extending part 202 is configured to shield effect of a signal of the corresponding one of the data lines 40 on a signal of the first pixel electrode 101. That is, the second pixel electrode extending part 202 is configured to shield interference of the signal of the corresponding one of the data lines 40 to the first pixel electrode 101. The second pixel electrode extending part 202 is positioned near one side of the corresponding one of the data lines 40 or covers the corresponding one of the data lines 40. A distance is required between the second pixel electrode extending part 202 and the first pixel electrode 101. A voltage potential of the second pixel electrode extending part 202 can isolate effect of an electric field of the correspond one of the data lines 40 on the first pixel electrode 101.

In one embodiment, a metal electrode plate for light shielding and shielding the corresponding one of the data lines 40 is not disposed at one side of the corresponding one of the data lines. The metal electrode plate for light shielding is configured to shield effect of the signal of the corresponding one of the data lines 40 on the signal of the first pixel electrode 101. A material of the metal electrode plate for light shielding is a physical light shielding material.

Figure 3:
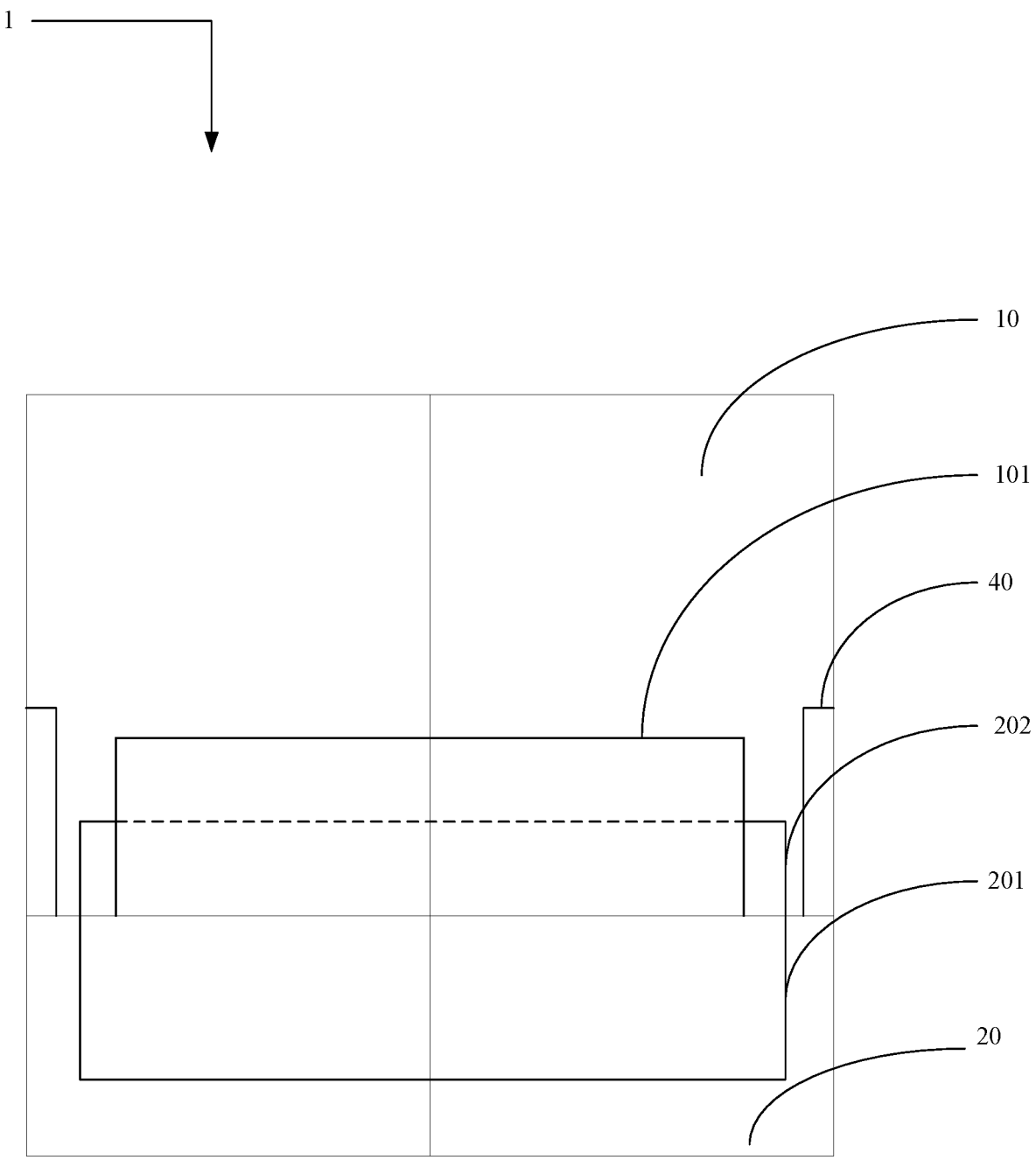
FIG. 3 illustrates a second enlarged diagram of the array substrate provided by an embodiment of the present disclosure.

In one embodiment, as shown in FIG. 3, a size of the second pixel electrode body part 201 is smaller than a size of the second pixel electrode extending part 202.

In the present embodiment, the second pixel electrode extending part 202 replaces the metal electrode plate for light shielding. The array substrate does not include the metal electrode plate for light shielding disposed thereon.

In the present embodiment, the aperture ratio and the transmittance are increased to a greater extent, but capacitance between the first pixel electrode 101 and the corresponding one of the data lines 40 is increased. Risk of cross interference in a panel is unknown. The risk of cross interference is described as follows. Assuming that one pixel is charged to a specific signal. In another period, since a data line 40 corresponding to the one pixel needs to charge another pixel, gray level brightness of the one pixel is changed due to coupling capacitance.

In one embodiment, the size of the second pixel electrode body part 201 is greater than the size of the second pixel electrode extending part 202.

In the present embodiment, the second pixel electrode extending part 202 replaces a part of the metal electrode plate for light shielding. The metal electrode plate for light shielding is disposed in an area in which the second pixel electrode extending part 202 is not disposed. The second pixel electrode extending part 202 and the metal electrode plate for light shielding are disposed at one side of the corresponding one of the data lines 40. As such, not only the aperture ratio and the transmittance can be increased, but also the corresponding one of the data lines 40 can be shielded to decrease the effect of the signal of the corresponding one of the data lines 40 on the signal of the first pixel electrode 101.

In the present embodiment, the metal electrode plate for light shielding is generally formed when a gate electrode is formed. The metal electrode plate for light shielding is insulated with the gate electrode. The metal electrode plate for light shielding is configured to provide a storage capacitor and shield interference of light leakage of the corresponding one of the data lines 40.

Figure 4:
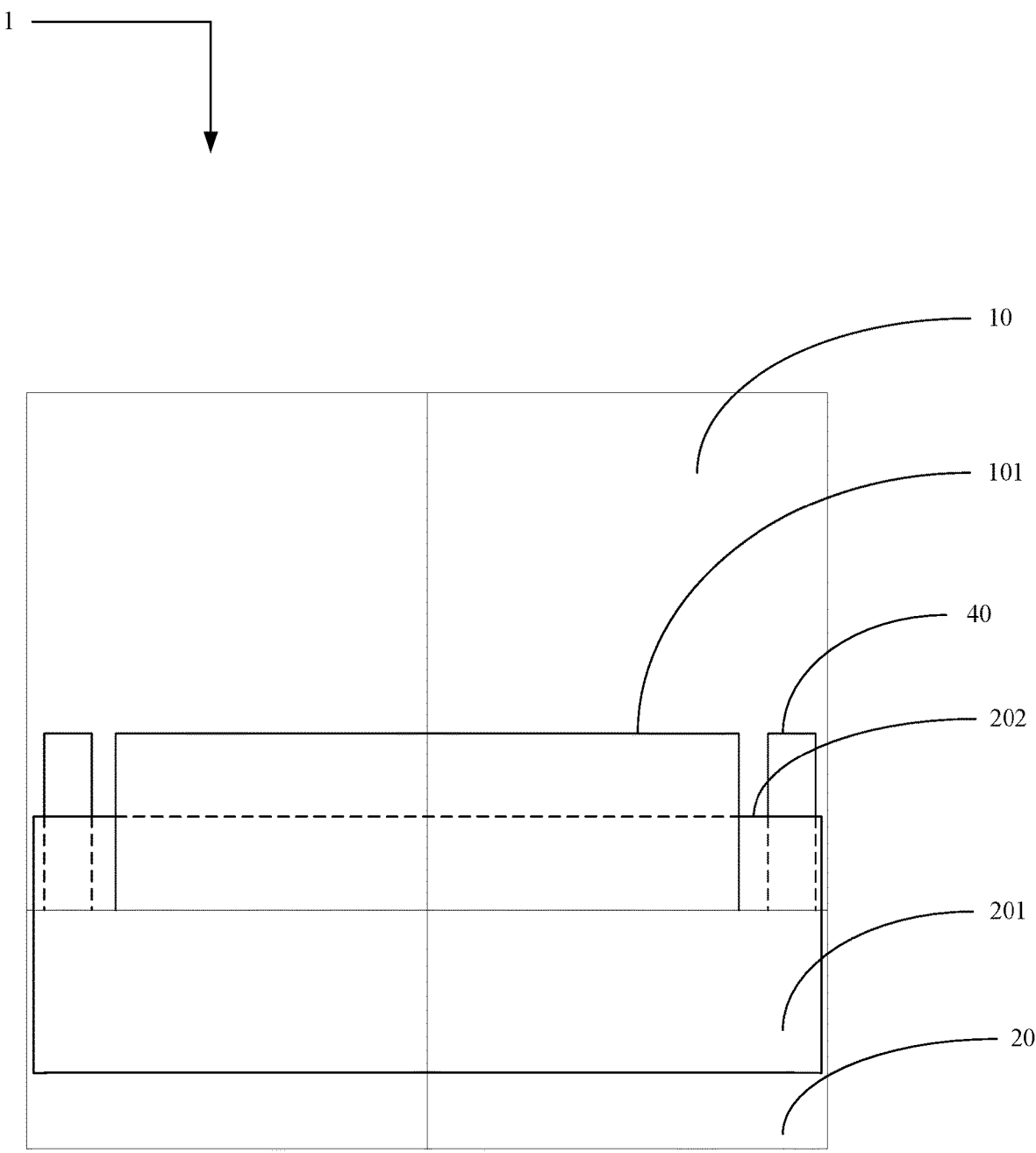
FIG. 4 illustrates a third enlarged diagram of the array substrate provided by an embodiment of the present disclosure.

In one embodiment, as shown in FIG. 4, in the main display area 10, the second pixel electrode extending part 202 is disposed to overlap with the corresponding one of the data lines 40. The voltage potential of the second pixel electrode extending part 202 can shield the signal of the corresponding one of the data lines 40, thereby avoiding that the signal of the corresponding one of the data lines 40 interferes with the signal of the first pixel electrode 101.

In one embodiment, in the main display area 10, an overlapping range of the second pixel electrode extending part 202 and the corresponding one of the data lines 40 is from 0.5 micrometers to 3 micrometers.

In one embodiment, the overlapping range is 3 micrometers. In the present embodiment, the effect of shielding the corresponding one of the data lines 40 is best.

In one embodiment, in the main display area 10, the second pixel electrode extending part 202 is disposed to not overlap with the corresponding one of the data lines 40.

In the present embodiment, two electrode plates having the same voltage are respectively disposed on the array substrate and the color filter substrate. Liquid crystal molecules are fixed and not orientated. In a VA mode, the liquid crystal molecules are aligned vertically to maintain a dark state.

In one embodiment, the second pixel electrode extending part 202 surrounds half of the corresponding one of the data lines 40. The interference of the signal of the corresponding one of the data lines 40 to the first pixel electrode 101 can be shielded by isolating the corresponding one of the data lines 40.

Figure 5:
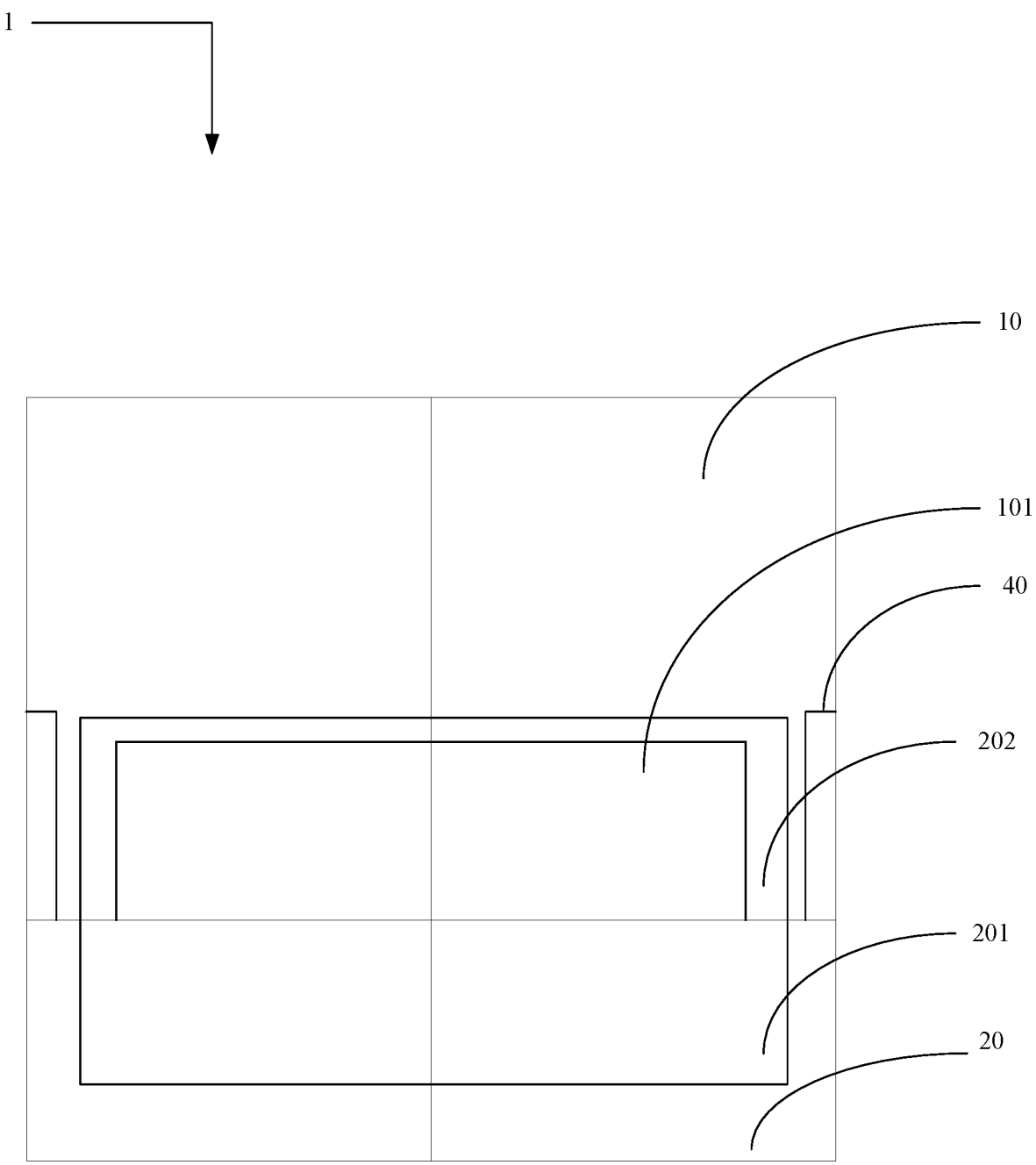
FIG. 5 illustrates a fourth enlarged diagram of the array substrate provided by an embodiment of the present disclosure.

In one embodiment, as shown in FIG. 5, the second pixel electrode extending part 202 surrounds the first pixel electrode 101. The interference of the signal of the corresponding one of the data lines 40 to the signal of the first pixel electrode 101 can be shielded by isolating the first pixel electrode 101.

In one embodiment, a distance between the second pixel electrode extending part 202 and the first pixel electrode 101 is from 3 micrometers to 5 micrometers. The distance ranged from 3 micrometers to 5 micrometers is a safe insulation distance. In all of the embodiments of the present disclosure, the second pixel electrode extending part 202 and the first pixel electrode 101 are insulated with each other.

In one embodiment, the second pixel electrode extending part 202 is disposed at two sides of the first pixel electrode 101. The metal electrode plate for light shielding is not disposed.

In one embodiment, the second pixel electrode extending part 202 is disposed at one side of the first pixel electrode 101 near the corresponding one of the data lines 40. The metal electrode plate for light shielding is not disposed at the one side of the first pixel electrode 101 near the corresponding one of the data lines 40. The second pixel electrode extending part 202 is not disposed at the other side of the first pixel electrode 101.

In one embodiment, in the main display area 10, the second pixel electrode extending part 202 is disposed to overlap with the corresponding one of the data lines 40.

In one embodiment, in the main display area 10, the overlapping range of the second pixel electrode extending part 202 and the corresponding one of the data lines 40 is from 0.5 micrometers to 3 micrometers.

In one embodiment, in the main display area 10, the second pixel electrode extending part 202 is disposed to not overlap with the corresponding one of the data lines 40.

In one embodiment, the second pixel electrode extending part 202 surrounds half of the first pixel electrode 101.

In one embodiment, the second pixel electrode extending part 202 surrounds the first pixel electrode 101.

In one embodiment, the second pixel electrode extending part 202 and the first pixel electrode 101 are insulated with each other.

In one embodiment, a distance between the second pixel electrode extending part 202 and the first pixel electrode 101 is from 3 micrometers to 5 micrometers.

As shown in FIG. 1 and FIG. 2, a display panel provided by an embodiment of the present disclosure includes a substrate, a plurality of scan lines 30 disposed on the substrate in a horizontal direction and arranged in parallel, a plurality of data lines 40 disposed on the substrate in a vertical direction and arranged in parallel, and a plurality of pixel units 50 disposed on the substrate in a matrix. Each of the scan lines 30 is disposed corresponding to one row of the pixel units 50. Two adjacent ones of the data lines 40 define boundaries of the pixel units 50. Each of the pixel units 50 has a main display area 10 and an auxiliary display area 20. Each of the pixel units 50 includes a first pixel electrode 101 positioned in the main display area 10 and a second pixel electrode positioned in the auxiliary display area 20. The auxiliary display area 20 of one of the pixel units 50 is disposed adjacent to the main display area 10 of another one of the pixel units 50. The one of the pixel units 50 and the another one of the pixel units 50 are positioned in two adjacent rows. The second pixel electrode positioned in the auxiliary display area 20 of the one of the pixel units 50 extends, between the two adjacent ones of the pixel units 50, to the main display area of the another one of the pixel units 50. The second pixel electrode includes a second pixel electrode extending part 202 positioned in the main display area 10 of the another one of the pixel units 50 and a second pixel electrode body part 201 positioned in the auxiliary display area 20 of the one of the pixel units 50. The second pixel electrode extending part 202 is disposed between the first pixel electrode 101 and a corresponding one of the data lines 40. The second pixel electrode extending part 202 surrounds a part of the first pixel electrode 101 near the corresponding one of the data lines 40.

In the present embodiment, the array substrate of the display panel includes the main display area 10 and the auxiliary display area 20. The main display area 10 and the auxiliary display area 20 respectively include four small areas. Voltage differences exist between the array substrate and a color filter substrate. By cooperation of devices, the voltage differences in the main display area 10 are greater than the voltage differences in the auxiliary display area 20, and orientations of liquid crystal molecules are different. Accordingly, a viewing angle is improved, and a brightness difference is embodied when an image is displayed. In particularly, in a middle or low gray level (e.g., L100 or below), it can be seen that the main display area 100 is in a bright state, and the auxiliary display area 20 is in a dark state.

In the present embodiment, the array substrate of the display panel includes the second pixel electrode extending part 202. The second pixel electrode extending part 202 is configured to shield effect of a signal of the corresponding one of the data lines 40 on a signal of the first pixel electrode 101. That is, the second pixel electrode extending part 202 is configured to shield interference of the signal of the corresponding one of the data lines 40 to a MainPE pixel electrode. The second pixel electrode extending part 202 is positioned near one side of the corresponding one of the data lines 40 or covers the corresponding one of the data lines 40. A distance is required between the second pixel electrode extending part 202 and the first pixel electrode 101. A voltage potential of the second pixel electrode extending part 202 can isolate effect of an electric field of the corresponding one of the data lines 40 on the first pixel electrode 101.

In one embodiment, in the display panel, a metal electrode plate for light shielding and shielding the corresponding one of the data lines 40 is not disposed at one side of the corresponding one of the data lines. The metal electrode plate for light shielding is configured to shield effect of the signal of the corresponding one of the data lines 40 on the signal of the first pixel electrode 101. A material of the metal electrode plate for light shielding is a physical light shielding material.

In one embodiment, in the display panel, a size of the second pixel electrode body part 201 is smaller than a size of the at least one second pixel electrode extending part 202.

In the present embodiment, in the display panel, the second pixel electrode extending part 202 replaces the metal electrode plate for light shielding. The array substrate does not include the metal electrode plate for light shielding disposed thereon.

In the present embodiment, the aperture ratio and the transmittance of the display panel are increased to a greater extent, but capacitance between the first pixel electrode 101 and the corresponding one of the data lines 40 is increased. Risk of cross interference in the panel is unknown. The risk of cross interference is described as follows. Assuming that one pixel is charged to a specific signal. In another period, since a data line 40 corresponding to the one pixel needs to charge another pixel, gray level brightness of the one pixel is changed due to coupling capacitance.

In one embodiment, as shown in FIG. 3, in the display panel, the size of the second pixel electrode body part 201 is greater than the size of the second pixel electrode extending part 202.

In the present embodiment, the second pixel electrode extending part 202 replaces a part of the metal electrode plate for light shielding. The metal electrode plate for light shielding is disposed in an area in which the second pixel electrode extending part 202 is not disposed. The second pixel electrode extending part 202 and the metal electrode plate for light shielding are disposed at one side of the corresponding one of data lines 40. As such, not only the aperture ratio and the transmittance can be increased, but also the corresponding one of data lines 40 can be shielded to decrease the effect of the signal of the corresponding one of data lines 40 on the signal of the first pixel electrode 101.

In the present embodiment, the metal electrode plate for light shielding is generally formed when a gate electrode is formed. The metal electrode plate for light shielding is insulated with the gate electrode. The metal electrode plate for light shielding is configured to provide a storage capacitor and shield interference of light leakage of the corresponding one of the data lines 40.

In one embodiment, as shown in FIG. 4, in the main display area 10 in the display panel, the second pixel electrode extending part 202 is disposed to overlap with the corresponding one of the data lines 40. The voltage potential of the second pixel electrode extending part 202 can shield the signal of the corresponding one of the data lines 40, thereby avoiding that the signal of the corresponding one of the data lines 40 interferes with the signal of the first pixel electrode 101.

In one embodiment, in the main display area 10 in the display panel, an overlapping range of the second pixel electrode extending part 202 and the corresponding one of the data lines 40 is from 0.5 micrometers to 3 micrometers.

In one embodiment, in the display panel, the overlapping range is 3 micrometers. In the present embodiment, the effect of shielding the corresponding one of the data lines 40 is best.

In one embodiment, in the main display area 10 in the display panel, the second pixel electrode extending part 202 is disposed to not overlap with the corresponding one of the data lines 40.

In the present embodiment, two electrode plates having the same voltage are respectively disposed on the array substrate and the color filter substrate. Liquid crystal molecules are fixed and not orientated. In a VA mode, the liquid crystal molecules are aligned vertically to maintain a dark state.

In one embodiment, in the display panel, the second pixel electrode extending part 202 surrounds half of the corresponding one of the data lines 40. The interference of the signal of the corresponding one of the data lines 40 to the first pixel electrode 101 can be shielded by isolating the corresponding one of the data lines 40.

In one embodiment, as shown in FIG. 5, the second pixel electrode extending part 202 surrounds the first pixel electrode 101. The interference of the signal of the corresponding one of the data lines 40 to the signal of the first pixel electrode 101 can be shielded by isolating the first pixel electrode 101.

In one embodiment, in the display panel, a distance between the second pixel electrode extending part 202 and the first pixel electrode 101 is from 3 micrometers to 5 micrometers. The distance ranged from 3 micrometers to 5 micrometers is a safe insulation distance. In all of the embodiments of the present disclosure, the second pixel electrode extending part 202 and the first pixel electrode 101 are insulated with each other.

It can be appreciated from the above-mentioned embodiments that the present disclosure provides an array substrate. The array substrate includes a substrate, a plurality of scan lines, a plurality of data lines, and a plurality of pixel units disposed in a matrix. In two adjacent ones of the pixel units in two adjacent rows, a second pixel electrode in an auxiliary area of one of the two adjacent ones of the pixel units extends to a main display area of the other of the two adjacent ones of the pixel units. A second pixel electrode extending part is disposed between a first pixel electrode and a corresponding one of the data lines. A metal electrode plate for light shielding is not disposed in an area in which the second pixel electrode extending part is disposed, and thus a transmittance is increased.

In summary, although the present disclosure has been provided in the preferred embodiments described above, the foregoing preferred embodiments are not intended to limit the present disclosure. Those skilled in the art, without departing from the spirit and scope of the present disclosure, may make modifications and variations, so the scope of the protection of the present disclosure is defined by the claims.

What is claimed is:

1. An array substrate, comprising:
a substrate;
a plurality of scan lines disposed on the substrate in a horizontal direction and arranged in parallel;
a plurality of data lines disposed on the substrate in a vertical direction and arranged in parallel; and
a plurality of pixel units disposed on the substrate in a matrix, each of the scan lines disposed corresponding to one row of the pixel units, each of the data lines disposed corresponding to one column of the pixel units, and two adjacent ones of the data lines defining boundaries of the pixel units,
wherein each of the pixel units has a main display area and an auxiliary display area,
each of the pixel units comprises a first pixel electrode positioned in the main display area and a second pixel electrode positioned in the auxiliary display area,
the auxiliary display area of one of the pixel units is disposed adjacent to the main display area of another one of the pixel units,
the one of the pixel units and another one of the pixel units are positioned in two adjacent rows,
the second pixel electrode positioned in the auxiliary display area of the one of the pixel units extends, between the two adjacent ones of the pixel units, to the main display area of the another one of the pixel units,
the second pixel electrode comprises a second pixel electrode extending part positioned in the main display area of the another one of the pixel units and a second pixel electrode body part positioned in the auxiliary display area of the one of the pixel units,
the second pixel electrode extending part is disposed between the first pixel electrode and a corresponding one of the data lines,
the second pixel electrode extending part surrounds a part of the first pixel electrode near the corresponding one of the data lines, and
wherein in the main display area, the second pixel electrode extending part is disposed to overlap with the corresponding one of the data lines in a plan view, and an overlapping range of the second pixel electrode extending part and the corresponding one of the data lines is from 0.5 micrometers to 3 micrometers in the plan view.

2. The array substrate of claim 1, wherein the second pixel electrode extending part is disposed at two sides of the first pixel electrode, and a metal electrode plate for light shielding and shielding the corresponding one of the data lines is not disposed between the corresponding one of the data lines and the first pixel electrode.

3. The array substrate of claim 1, wherein the second pixel electrode extending part is disposed at one side of the first pixel electrode near the corresponding one of the data lines, a metal electrode plate for light shielding and shielding the corresponding one of the data lines is not disposed at the one side of the first pixel electrode near the corresponding one of the data lines, and the second pixel electrode extending part is not disposed at the other side of the first pixel electrode.

4. The array substrate of claim 1, wherein the second pixel electrode extending part surrounds half of the first pixel electrode.

5. The array substrate of claim 1, wherein the second pixel electrode extending part and the first pixel electrode are insulated with each other.

6. The array substrate of claim 5, wherein a distance between the second pixel electrode extending part and the first pixel electrode is from 3 micrometers to 5 micrometers.

7. A display panel, comprising an array substrate, a color filter substrate, and liquid crystals positioned between the array substrate and the color filter substrate, the array substrate comprising:
a substrate;
a plurality of scan lines disposed on the substrate in a horizontal direction and arranged in parallel;
a plurality of data lines disposed on the substrate in a vertical direction and arranged in parallel; and
a plurality of pixel units disposed on the substrate in a matrix, each of the scan lines disposed corresponding to one row of the pixel units, each of the data lines disposed corresponding to one column of the pixel units, and two adjacent ones of the data lines defining boundaries of the pixel units,
wherein each of the pixel units has a main display area and an auxiliary display area,
each of the pixel units comprises a first pixel electrode positioned in the main display area and a second pixel electrode positioned in the auxiliary display area,
the auxiliary display area of one of the pixel units is disposed adjacent to the main display area of another one of the pixel units,
the one of the pixel units and the another one of the pixel units are positioned in two adjacent rows,
the second pixel electrode positioned in the auxiliary display area of the one of the pixel units extends, between the two adjacent ones of the pixel units, to the main display area of the another one of the pixel units,
the second pixel electrode comprises a second pixel electrode extending part positioned in the main display area of the another one of the pixel units and a second pixel electrode body part positioned in the auxiliary display area of the one of the pixel units,
the second pixel electrode extending part is disposed between the first pixel electrode and a corresponding one of the data lines,
the second pixel electrode extending part surrounds a part of the first pixel electrode near the corresponding one of the data lines, and
wherein in the main display area, the second pixel electrode extending part is disposed to overlap with the corresponding one of the data lines in a plan view, and an overlapping range of the second pixel electrode extending part and the corresponding one of the data lines is from 0.5 micrometers to 3 micrometers in the plan view.

8. The display panel of claim 7, wherein the second pixel electrode extending part is disposed at two sides of the first pixel electrode, and a metal electrode plate for light shielding and shielding the corresponding one of the data lines is not disposed between the corresponding one of the data lines and the first pixel electrode.

9. The display panel of claim 7, wherein the second pixel electrode extending part is disposed at one side of the first pixel electrode near the corresponding one of the data lines, a metal electrode plate for light shielding and shielding the corresponding one of the data lines is not disposed at the one side of the first pixel electrode near the corresponding one of the data lines, and the second pixel electrode extending part is not disposed at the other side of the first pixel electrode.

10. The display panel of claim 7, wherein the second pixel electrode extending part surrounds half of the first pixel electrode.

11. The display panel of claim 7, wherein the second pixel electrode extending part and the first pixel electrode are insulated with each other.

12. The display panel of claim 11, wherein a distance between the second pixel electrode extending part and the first pixel electrode is from 3 micrometers to 5 micrometers.

* * * * *